(12) United States Patent
DiMarco et al.

(10) Patent No.: US 8,405,945 B2
(45) Date of Patent: Mar. 26, 2013

(54) POWER DISTRIBUTION UNIT BRANCH PROTECTION

(75) Inventors: Robert DiMarco, Research Triangle Park, NC (US); Cecil C. Dishman, Research Triangle Park, NC (US); Eino A. Lindfors, Research Triangle Park, NC (US); Randhir S. Malik, Research Triangle park, NC (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/687,362

(22) Filed: Jan. 14, 2010

(65) Prior Publication Data

US 2011/0170223 A1   Jul. 14, 2011

(51) Int. Cl.
*H02H 3/08* (2006.01)
*H02H 5/04* (2006.01)

(52) U.S. Cl. .......... 361/93.1; 361/87; 361/104; 361/160

(58) Field of Classification Search .............. 361/93.1, 361/93.2, 87, 104, 160
See application file for complete search history.

(56) References Cited

U.S. PATENT DOCUMENTS

| | | | | |
|---|---|---|---|---|
| 2,770,757 A | * | 11/1956 | Edsall | 361/104 |
| 3,525,019 A | * | 8/1970 | Lansch | 361/78 |
| 3,766,435 A | | 10/1973 | Childers | |
| 3,829,627 A | * | 8/1974 | Short et al. | 379/24 |
| 4,425,596 A | | 1/1984 | Satou | |
| 4,536,814 A | | 8/1985 | Theisen et al. | |
| 4,996,625 A | * | 2/1991 | Soma et al. | 361/87 |
| 5,777,836 A | | 7/1998 | Price et al. | |
| 6,633,472 B2 | * | 10/2003 | Lai | 361/93.1 |
| 7,276,871 B2 | * | 10/2007 | Ganev et al. | 318/434 |
| 7,342,762 B2 | * | 3/2008 | Harris, IV | 361/103 |
| 7,593,198 B2 | | 9/2009 | Brereton et al. | |
| 7,856,488 B2 | * | 12/2010 | Cripe et al. | 709/220 |

FOREIGN PATENT DOCUMENTS

JP   55166701   12/1980

OTHER PUBLICATIONS

Hamed B. Funmilayo, An Approach to Mitigate the Impact of Distributed Generation on the Overcurrent Protection Scheme for Radial Feeders, Power Systems Conference and Exposition, 2009. PES '09. IEEE/PES Mar. 15-18, 2009 pp. 1-11.

* cited by examiner

*Primary Examiner* — Rexford Barnie
*Assistant Examiner* — Zeev V Kitov
(74) *Attorney, Agent, or Firm* — Kunzler Law Group, PC

(57) ABSTRACT

An apparatus and system are disclosed for protecting a power distribution unit from an electrical fault. A fuse interrupts a flow of electrical current in response to the electrical current rising above a current rating of the fuse. A current sensor measures the amplitude of the electrical current and outputs a current amplitude signal. A relay interrupts the flow of electrical current in response to an OFF signal. A fault module receives the current amplitude signal and sends the OFF signal to the relay in response to the amplitude of the electrical current exceeding a threshold value. The relay, the fuse, and the threshold value are selected so that a switching time of the relay is less than an opening time of the fuse for an amplitude of the electrical current between the threshold value and a maximum fault current value, so that the relay prevents the fuse from opening.

18 Claims, 5 Drawing Sheets

POWER DISTRIBUTION UNIT BRANCH PROTECTION

BACKGROUND

1. Field of the Invention

This invention relates to power distribution units and more particularly relates to branch protection within power distribution units.

2. Description of the Related Art

Power distribution units ("PDUs") are used to distribute electric power for electrically intensive applications such as computer data centers, industrial equipment, electric motors, and the like. PDUs typically have a safe grounding system and provide overcurrent protection using circuit breakers.

Including circuit breakers in a PDU, however, has several negative effects. For example, using circuit breakers increases the cost of the PDU. If a separate circuit breaker is used for each outlet of a PDU, the circuit breakers increase the cost of the PDU dramatically.

Additionally, if a circuit breaker trips, it must be physically reset, even after an overcurrent fault has been remedied. This means that once a circuit breaker trips, the outlets protected by the circuit breaker cannot be used again until someone arrives on location and resets the circuit breaker. This can extend power interruptions long after the overcurrent fault no longer exists.

Circuit breakers also generate heat. PDUs are often enclosed and have no fans or other cooling systems. Including circuit breakers in the enclosed, fanless environment of a PDU increases the operating temperature of the PDU dramatically. High temperatures can affect the operation of a PDU itself, increase temperatures of other equipment around the PDU, and pose a safety threat.

Circuit breakers can also be rather bulky. Including circuit breakers in a PDU increases the size of the PDU. Larger PDUs require more material to manufacture, increasing material costs. PDUs that are larger are also less flexible in use, requiring more space in what are often tight quarters.

Further, circuit breakers can take a long time to trip during overcurrent conditions. Extended periods of overcurrent conditions can cause output voltages to sag and may have other negative effects on an electrical load that receives power from the PDU. Using circuit breakers for PDU branch protection trades cost, convenience, heat, and size for safety.

BRIEF SUMMARY

From the foregoing discussion, it should be apparent that a need exists for an apparatus and system that protect a PDU from electrical faults. Beneficially, such an apparatus, system, and method would generate little heat, have a fast trip time, be remotely resettable, and reduce sizes and costs of PDUs.

The present invention has been developed in response to the present state of the art, and in particular, in response to the problems and needs in the art that have not yet been fully solved by currently available PDU branch protection. Accordingly, the present invention has been developed to provide an apparatus and system for protecting a PDU from an electrical fault that overcome many or all of the above-discussed shortcomings in the art.

The apparatus to protect a PDU from an electrical fault is provided with a plurality of elements. These elements in the described embodiments include an alternating current ("AC") electrical input, a fuse, a current sensor, a relay, a fault module, an AC electrical output, a remote command module, and an analog to digital converter.

In one embodiment, the AC electrical input receives a flow of AC electrical current for a PDU. The flow of AC electrical current received at the AC electrical input, in one embodiment, is a single parallel branch from a single phase of a three phase AC power source connected to the PDU. In a further embodiment, each of the three phases are split into several parallel branches within the PDU. The PDU, in another embodiment includes a fuse, a current sensor, a relay, and a fault module for each parallel branch.

In one embodiment, the fuse interrupts the flow of electrical current in response to the electrical current rising above a current rating of the fuse. The fuse, in a further embodiment, interrupts the flow of electrical current according to an inverse time-current function that defines an opening time of the fuse based on an amplitude of the electrical current. In one embodiment, the opening time decreases as the amplitude of the electrical current increases. The current rating of the fuse, in another embodiment, is sized to protect the electrical load. In a further embodiment, the fuse is a slow-blow, time-delay fuse.

In one embodiment, the current sensor measures the amplitude of the electrical current. The current sensor, in another embodiment, outputs a current amplitude signal that represents the amplitude of the electrical current. In a further embodiment, the current amplitude signal has a voltage proportional to the amplitude of the electrical current. The current sensor, in another embodiment, may include a Hall effect current sensor, a current transformer, or a current sense resistor.

In one embodiment, the relay interrupts the flow of electrical current in response to an OFF signal and allows the flow of electrical current to continue from the AC electrical input in response to an ON signal. The relay, in a further embodiment, has a switching time that is an amount of time that passes from a time that the amplitude of the electrical current exceeds a threshold value to a time that the relay interrupts the flow of electrical current.

In one embodiment, the switching time of the relay is at least ten times less than the opening time of the fuse for an amplitude of the electrical current between a threshold value and a maximum fault current value. In a further embodiment, the switching time of the relay is less than about fifty milliseconds and the opening time of the fuse for the amplitude of the electrical current between the threshold value and the maximum fault current value is greater than about half of a second. The relay, in one embodiment, is a mercury-wetted relay.

In one embodiment, the fault module receives the current amplitude signal and sends the OFF signal to the relay in response to the amplitude of the electrical current exceeding a threshold value. In a further embodiment, the relay, the fuse, and the threshold value are selected such that the switching time of the relay is less than the opening time of the fuse for an amplitude of the electrical current between the threshold value and a maximum fault current value. The fault module, in another embodiment, prevents the fuse from opening by sending the OFF signal to the relay to interrupt the flow of electrical current.

In one embodiment, the maximum fault current value comprises an amplitude of the electrical current for a bolted fault at an output of the relay given path impedances between a source of the AC electrical current and the bolted fault. The threshold value for the electrical current, in another embodiment, is about thirty percent greater than the current rating of the fuse. The fault module, in a further embodiment, instantaneously sends the OFF signal to the relay in response to the amplitude of the electrical current exceeding the threshold value.

In one embodiment, the AC electrical output provides the flow of AC electrical current to an electrical load. The fuse and the relay, in another embodiment, are in a series configuration between the AC electrical input and the AC electrical output within the PDU. In a further embodiment, the electrical load comprises a power supply unit ("PSU") of a blade server enclosure.

In one embodiment, the remote command module sends the OFF signal to the relay to interrupt the flow of AC electrical current to the electrical load in response to an OFF remote communications signal. In another embodiment, the remote command module sends the ON signal to the relay to provide the flow of AC electrical current to the electrical load in response to an ON remote communications signal.

In one embodiment, the analog to digital converter converts the current amplitude signal from an analog signal to a digital signal. In another embodiment, the current sensor provides the analog signal to the analog to digital converter and the fault module receives the digital signal from the analog to digital converter.

A system of the present invention is also presented to protect a PDU from an electrical fault. The system may be embodied by a PDU, an electrical load, an AC electrical input, a fuse, a current sensor, a relay, a fault module, an AC electrical input, a remote command module, and a current sensor. In one embodiment, the electrical load is connected to the PDU, receiving a flow of AC electrical current from the AC electrical output.

In one embodiment, the AC electrical input receives a flow of AC electrical current for the PDU. The flow of AC electrical current received at the AC electrical input, in one embodiment, is a single parallel branch from a single phase of a three phase AC power source connected to the PDU. In a further embodiment, each of the three phases are split into a plurality of parallel branches within the PDU. The PDU, in another embodiment includes a fuse, a current sensor, a relay, and a fault module for each parallel branch.

In one embodiment, the fuse interrupts the flow of electrical current in response to the electrical current rising above a current rating of the fuse. The fuse, in a further embodiment, interrupts the flow of electrical current according to an inverse time-current function that defines an opening time of the fuse based on an amplitude of the electrical current. In one embodiment, the opening time decreases as the amplitude of the electrical current increases. The current rating of the fuse, in another embodiment, is sized to protect the electrical load. In a further embodiment, the fuse is a slow-blow, time-delay fuse.

In one embodiment, the current sensor measures the amplitude of the electrical current. The current sensor, in another embodiment, outputs a current amplitude signal that represents the amplitude of the electrical current. In a further embodiment, the current amplitude signal has a voltage proportional to the amplitude of the electrical current. The current sensor, in another embodiment, may include a Hall effect current sensor, a current transformer, or a current sense resistor.

In one embodiment, the relay interrupts the flow of electrical current in response to an OFF signal and allows the flow of electrical current to continue from the AC electrical input in response to an ON signal. The relay, in a further embodiment, has a switching time that is an amount of time that passes from a time that the amplitude of the electrical current exceeds a threshold value to a time that the relay interrupts the flow of electrical current.

In one embodiment, the switching time of the relay is at least ten times less than the opening time of the fuse for an amplitude of the electrical current between a threshold value and a maximum fault current value. In a further embodiment, the switching time of the relay is less than about fifty milliseconds and the opening time of the fuse for the amplitude of the electrical current between the threshold value and the maximum fault current value is greater than about half of a second. The relay, in one embodiment, is a mercury-wetted relay.

In one embodiment, the fault module receives the current amplitude signal and sends the OFF signal to the relay in response to the amplitude of the electrical current exceeding a threshold value. In a further embodiment, the relay, the fuse, and the threshold value are selected such that the switching time of the relay is less than the opening time of the fuse for an amplitude of the electrical current between the threshold value and a maximum fault current value. The fault module, in another embodiment, prevents the fuse from opening by sending the OFF signal to the relay to interrupt the flow of electrical current.

In one embodiment, the maximum fault current value comprises an amplitude of the electrical current for a bolted fault at an output of the relay given path impedances between a source of the AC electrical current and the bolted fault. The threshold value for the electrical current, in another embodiment, is about thirty percent greater than the current rating of the fuse. The fault module, in a further embodiment, instantaneously sends the OFF signal to the relay in response to the amplitude of the electrical current exceeding the threshold value.

In one embodiment, the AC electrical output provides the flow of AC electrical current to the electrical load. The fuse and the relay, in another embodiment, are in a series configuration between the AC electrical input and the AC electrical output within the PDU. In a further embodiment, the electrical load comprises a PSU of a blade server enclosure.

In one embodiment, the remote command module sends the OFF signal to the relay to interrupt the flow of AC electrical current to the electrical load in response to an OFF remote communications signal. In another embodiment, the remote command module sends the ON signal to the relay to provide the flow of AC electrical current to the electrical load in response to an ON remote communications signal.

In one embodiment, the analog to digital converter converts the current amplitude signal from an analog signal to a digital signal. In another embodiment, the current sensor provides the analog signal to the analog to digital converter and the fault module receives the digital signal from the analog to digital converter.

An additional apparatus to protect a PDU from an electrical fault is provided with a plurality of elements. These elements in the described embodiments include an AC electrical input, a fuse, a current sensor, an analog to digital converter, a relay, a fault module, a remote command module, and an AC electrical output.

In one embodiment, the AC electrical input receives a flow of AC electrical current for a PDU. The flow of AC electrical current, in a further embodiment, is a single parallel branch from a single phase of a three phase AC power source and each of the three phases is split into a plurality of parallel branches within the PDU.

In one embodiment, the fuse interrupts the flow of electrical current in response to the electrical current rising above a current rating of the fuse according to an inverse time-current function that defines an opening time of the fuse based on an amplitude of the electrical current. In a further embodiment, the opening time decreases as the amplitude of the electrical current increases. In another embodiment, the fuse is a slow-blow, time-delay fuse, and the current rating of the fuse is sized to protect an electrical load.

In one embodiment, the current sensor measures the amplitude of the electrical current and outputs a current amplitude signal. The current amplitude signal, in a further embodiment, represents the amplitude of the electrical current. In another embodiment, the current sensor is a Hall effect current sensor and the current amplitude signal has a voltage that is proportional to the amplitude of the electrical current. In one embodiment, the analog to digital converter receives the current amplitude signal from the current sensor and converts the current amplitude signal from an analog signal to a digital signal.

In one embodiment, the relay interrupts the flow of electrical current in response to an OFF signal and allows the flow of electrical current to continue from the AC electrical input in response to an ON signal. The relay, in another embodiment, has a switching time that is an amount of time that passes from a time that the amplitude of the electrical current exceeds a threshold value to a time that the relay interrupts the flow of electrical current. In a further embodiment, the relay is a mercury-wetted relay.

In one embodiment, the fault module receives the current amplitude signal and sends the OFF signal to the relay in response to the amplitude of the electrical current exceeding a threshold value. The relay, the fuse, and the threshold value in another embodiment, are selected so that the switching time of the relay is at least ten times less than the opening time of the fuse for an amplitude of the electrical current between the threshold value and a maximum fault current value. The maximum fault current value, in one embodiment, is an amplitude of the electrical current for a bolted fault at an output of the relay given path impedances between a source of the AC electrical current and the bolted fault. In a further embodiment, the fault module prevents the fuse from opening by sending the OFF signal to the relay to interrupt the flow of electrical current.

In one embodiment, the remote command module sends the OFF signal to the relay to interrupt the flow of AC electrical current to the electrical load in response to an OFF remote communications signal. In a further embodiment, the remote command module sends the ON signal to the relay to provide the flow of AC electrical current to the electrical load in response to an ON remote communications signal.

In one embodiment, the AC electrical output provides the flow of AC electrical current to an electrical load. The fuse and the relay, in another embodiment, are in a series configuration between the AC electrical input and the AC electrical output within the PDU. The electrical load, in a further embodiment, is a PSU of a blade server enclosure. The PDU, in one embodiment, has a fuse, a current sensor, a relay, and a fault module for each parallel branch within the PDU.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
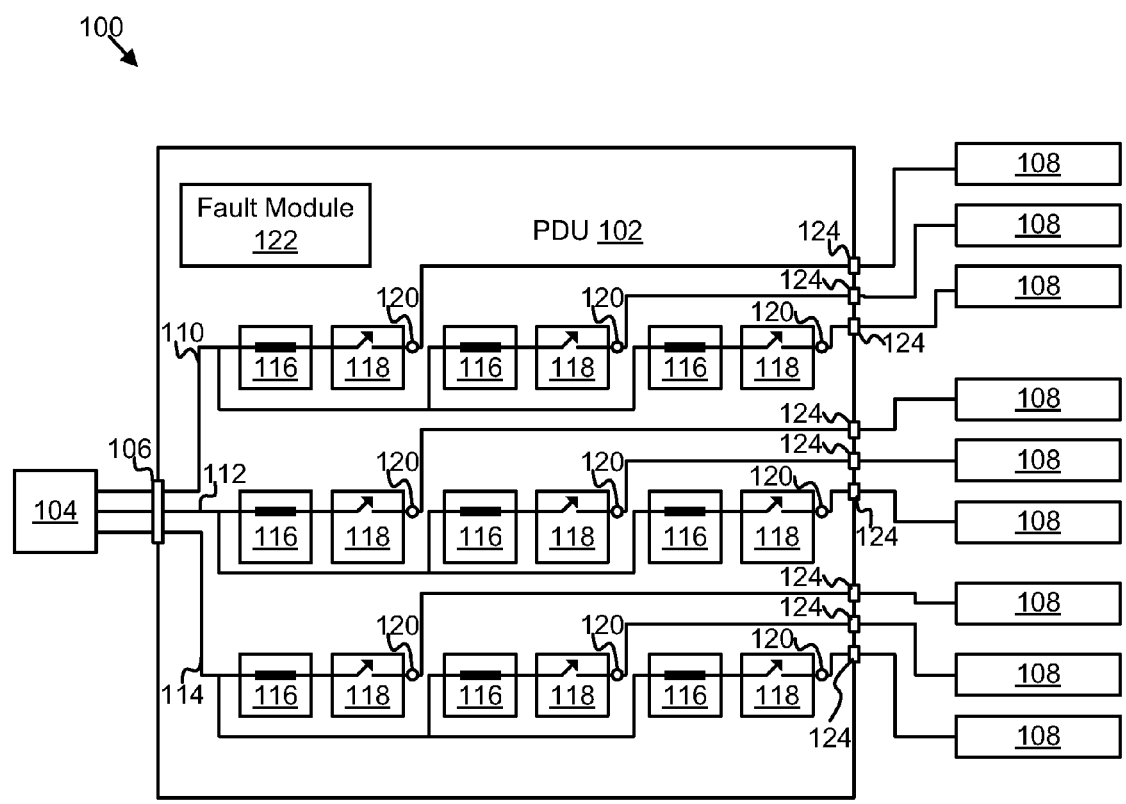
FIG. 1 is a schematic block diagram illustrating one embodiment of a system to protect a power distribution unit from an electrical fault in accordance with the present invention.

As will be appreciated by one skilled in the art, aspects of the present invention may be embodied as a system, method or apparatus. Accordingly, elements of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, and systems according to embodiments of the invention. It will be understood that each block of the schematic flowchart diagrams and/or schematic block diagrams, and combinations of blocks in the schematic flowchart diagrams and/or schematic block diagrams, can be implemented by logic hardware and/or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a system 100 to protect a power distribution unit ("PDU") 102 from an electrical fault. The system 100, in the depicted embodiment, is a one-line diagram (i.e. the neutral is not shown even though it is typically, but not always present in the actual circuit) and includes a PDU 102, an alternating current ("AC") source 104, an AC electrical input 106, several electrical loads 108, three AC phases 110, 112, 114, several fuses 116, several relays 118, several current sensors 120, a fault module 122, and several AC electrical outputs 124. In general, the system 100 interrupts a flow of AC electrical current in response to an overcurrent fault. Instead of using circuit breakers for branch protection, the system 100 detects electrical faults using the current sensors 120 and interrupts the AC electrical current using the relays 118. The fuses 116 provide a backup in case a relay 118 fails.

By protecting the PDU 102 using the fuses 116 in series with the relays 118, the PDU 102 can be manufactured at a reduced price in comparison to PDUs that use circuit breakers. The fuses 116, in one embodiment, are smaller in size than a circuit breaker, allowing the PDU 102 to have a reduced size. The fuses 116, in a further embodiment, generate little or no heat, allowing the PDU 102 to operate in an enclosed, fanless environment without generating high temperatures.

Additionally, the system 100, in one embodiment, can send an OFF signal to a relay 118 immediately upon detecting a fault, protecting the electrical loads 108 from sagging voltages and extended periods in overcurrent conditions. The system 100 can also close or reset an open relay 118 with an ON signal, unlike the physical reset required by a tripped circuit breaker. The relays 118, in one embodiment, prevent the fuses 116 from opening in an overcurrent condition by interrupting the electrical current, so that a user will not need to replace a fuse 116 unless a relay 118 fails. By using the fuses 116 in series with the relays 118, the PDU 102, in one embodiment, has a reduced cost, reduced temperatures, a reduced size, and faster fault reaction times over similar PDUs that use circuit breakers, with the added ability of being remotely resettable.

In the depicted embodiment, the PDU 102 receives AC electrical power from the AC source 104 and provides the AC electrical power to the electrical loads 108. The PDU 102 protects the electrical loads 108 from overcurrent electrical faults. In the depicted embodiment, the PDU 102 receives three AC phases 110, 112, 114 from the AC source 104, and splits each of the three AC phases 110, 112, 114 into three parallel branches to provide the AC electrical power to three electrical loads 108 per branch. Although three AC phases 110, 112, 114 are depicted, in a further embodiment, the PDU 102 may receive a single AC phase or another number of AC phases. Additionally, the PDU 102, in another embodiment, may split each AC phase 110, 112, 114 into a different number of branches, or the PDU 102 may not split the AC phases 110, 112, 114 at all.

In one embodiment, two or more relays 118 may act together and open together acting as a two-pole or a three-pole switch. In another embodiment, two or more relays may be physically ganged together to operate simultaneously. For example, three fuses 116 and relays 118 may serve a three-phase load 108, such as a motor and the three relays 118 open and close together. In another example, a line-to-line load 108 may have two fuses 116 and two relays 118 serving the load 108 and the two relays 118 may open and close together. The PDU 102 may be an independent unit or may be integrated with the electrical loads 108, the AC source 104, or the like.

In the depicted embodiment, the AC source 104 comprises a three phase AC power source with three AC phases 110, 112, 114. In a further embodiment, the AC source 104 may comprise a single phase AC power source or another type of AC power source. In one embodiment, the AC source 104 comprises an electrical connection to a utility, a power grid, or the like. Each AC phase 110, 112, 114, in one embodiment, has the same AC frequency with instantaneous peak values that are offset from the other AC phases 110, 112, 114. The AC phases 110, 112, 114 may have a neutral wire (not shown), or the loads 108 may be connected between phases 110, 112, 114.

In one embodiment, the AC electrical input 106 receives a flow of AC electrical current from the AC source 104. The AC electrical input 106 may include a connector, port, plug, outlet, contact, wire, or the like that makes an electrical connection with the AC source 104. The AC electrical input 106 may be an input for the entire PDU 102, or may be a sub-input for a single phase, branch, or line within the PDU 102. For example, in one embodiment, the AC electrical input 106 receives each of the three AC phases 110, 112, 114, while in another embodiment, the AC electrical input 106 may receive a single AC phase 110, a single parallel branch of an AC phase 110 that is split, or the like.

In one embodiment, the electrical loads 108 each receive a flow of AC electrical current from the PDU 102 through the AC electrical outputs 124. The electrical loads 108 may include power supply units ("PSUs"), AC to direct current ("DC") converters, motors, or other AC electrical loads. In one embodiment, the electrical loads 108 include a PSU for a network server device, such as a blade server enclosure or the like.

In the depicted embodiment, the three AC phases 110, 112, 114 are each split into three parallel branches within the PDU 102. Each parallel branch, as depicted, includes a fuse 116, a relay 118, and a current sensor 120. In a further embodiment, each parallel branch may include a fault module 122. A single fault module 122 may protect multiple parallel branches, or each parallel branch may include a separate fault module 122. In a further embodiment, a single fuse 116, relay 118, current sensor 120, and fault module 122 protects an entire AC phase 110, and the single AC phase 110 may be split into parallel branches after the fuse 116, the relay 118, and the current sensor 120.

In general, the fault module 122 uses a current sensor 120 to detect an overcurrent fault, and sends an OFF signal to a relay 118 in response to the overcurrent fault, preventing a fuse 116 in series with the relay 118 from opening. If a relay 118 fails, a fuse 116 interrupts the flow of electrical current in response to an amplitude of the electrical current rising above a current rating of the fuse 116. The fuses 116 generally serve as backup overcurrent protection for the relays 118. The fuses 116, in one embodiment, have current ratings that are sized to protect the electrical loads 108 from overcurrent faults. The current ratings of the fuses 116, in a further embodiment, may be selected based on opening times of the relays 118. In one embodiment, the fuses 116 are slow-blow, time-delay type fuses.

The fuses 116, in one embodiment, interrupt the flow of electrical current according to an inverse time-current function. The inverse time-current function defines an opening time of the fuses 116 based on an amplitude of the electrical current. According to the inverse time-current function, the opening time of the fuses 116 decreases as the amplitude of the electrical current increases. The inverse time-current function is described in greater detail with regard to FIG. 4.

Each relay 118 interrupts the flow of electrical current in response to an OFF signal and allows the flow of electrical current to continue in response to an ON signal. For example, in one embodiment, the OFF signal may be a low input line, with no input voltage, and the ON signal may be a high input line, with a predefined voltage. Alternatively, in another embodiment, the ON signal may be a low input line, with no input voltage, and the OFF signal may be a high input line, with a predefined voltage. In a further embodiment, the ON and OFF signals may include digital signals, commands, or the like. In the depicted embodiment, each relay 118 is in a series configuration with one of the fuses 116 such that the relays 118 prevent the fuses 116 from opening during overcurrent faults. In one embodiment, the relays 118 are mercury-wetted relays, or other fast switching relays.

In one embodiment, each relay 118 has a switching time. The switching time of a relay 118 is an amount of time that passes from a time that the amplitude of the electrical current exceeds a threshold value to a time that the relay 118 interrupts the flow of electrical current. The switching time of a relay 118, in one embodiment, includes a time for the current sensor 120 to measure the amplitude of the electrical current, send a current amplitude signal to the fault module 122, for the fault module 122 to determine that the amplitude exceeds the threshold value, send the OFF signal to the relay 118, and for the relay 118 to interrupt the flow of the electrical current. In a further embodiment, the time for the current sensor 120 to measure the amplitude of the electrical current, send a current amplitude signal to the fault module 122, for the fault module 122 to determine that the amplitude exceeds the threshold value, and to send the OFF signal to the relay 118 is small in comparison to the time it takes for the relay 118 to interrupt the electrical current.

The relays 118, in one embodiment, are selected so that the switching times of the relays 118 and a time required to generate the OFF signal are less than the opening times of the fuses 116 during overcurrent fault conditions that occur in the system 100. For example, in one embodiment, the switching times of the relays 118 are less than the opening times of the fuses 116 for a maximum fault current value for the system 100, given path impedances of the system 100.

Path impedances may include impedances of the AC source 104, of the AC phases 110, 112, 114, of a fault itself, and the like. In one embodiment, the maximum fault current value is an amplitude of the electrical current for a bolted fault at an output of a relay 118 given the path impedances of the system 100 between the AC source 104 and the bolted fault. While the fuses 116 may open very quickly under high electrical currents, the path impedances of the system 100 typically limit the electrical current to the maximum fault current value. In one embodiment, lines within the PDU 102 use wires with American wire gauge ("AWG") gauges of ten or higher, such as twelve gauge or fourteen gauge sized wires. Note that a twelve gauge wire is smaller than a ten gauge wire, a fourteen gauge wire is smaller than a twelve gauge wire, etc. As wire size decreases, impedance increases. Typically, for a bolted fault condition, a maximum fault current of a PDU 102 is limited by wiring within the PDU and a practical lower limit of impedance of the bolted fault, and source impedance of the AC source 104.

In one embodiment, the switching time of a relay 118 is at least ten times less than the opening time of a fuse 116 corresponding to the relay 118 for an amplitude of the electrical current between a threshold value and the maximum fault current value for the system 100. In a further embodiment, the switching time of a relay 118 is less than about fifty milliseconds and the opening time of a fuse 116 corresponding to the relay 118 is greater than about half of a second for the amplitude of the electrical current between a threshold value and the maximum fault current value for the system 100 with a typical PDU 102.

In one embodiment, the current sensors 120 measure the amplitude of the electrical current to detect an overcurrent fault for the fault module 122. The current sensors 120, in one embodiment, each output a current amplitude signal that represents the amplitude of the electrical current. The current amplitude signal may be a digital or analog signal. In one embodiment, the current amplitude signal is an analog signal with a voltage that is proportional to the amplitude of the electrical current. In a further embodiment, a current sensor 120 outputs an analog current amplitude signal and an analog to digital converter converts the analog signal to a digital signal.

The current sensors 120, in one embodiment, may include Hall effect current sensors, current transformers, current sense resistors, and the like. In one embodiment a current sensor 120 may be in series with a fuse 116 and a relay 118 and may receive and conduct the electrical current to measure its amplitude. In a further embodiment, the current sensor 120 may measure the electrical current independently of a carrier of the electrical current by measuring changes in a magnetic field around the carrier of the electrical current or the like.

In one embodiment, the fault module 122 sends an OFF signal to a relay 118 to interrupt the flow of electrical current in response to an overcurrent fault, preventing a fuse 116 corresponding to the relay 118 from opening. The fault module 122, in one embodiment, may be in communication with several of the relays 118. In a further embodiment, the fault module 122 may include several fault modules 122 that are each in communication with a single relay 118.

The fault module 122 receives current amplitude signals from one or more of the current sensors 120. In response to a current amplitude signal exceeding a threshold value for the current, the fault module 122 sends an OFF signal to the relay 118 corresponding to the current amplitude signal to prevent the fuse 116 corresponding to the current amplitude signal from opening. In one embodiment, the fault module 122 substantially instantaneously sends an OFF signal to a relay 118 in response to the amplitude of the electrical current exceeding the threshold value. This minimizes any delay caused by detecting an overcurrent and sending the OFF signal in comparison with the switching time of the relay 118. Measured current may be instantaneous current or may be a root-mean-square ("RMS") current.

In one embodiment, the relays 118, the fuses 116, and the threshold value are each selected such that the switching times of the relays 118 are less than the opening times of the fuses 116 for an amplitude of the electrical current between the threshold value and the maximum fault current value. As described above, the opening times of the fuses 116 are based on an inverse time-current function, and become shorter as the amplitude of the electrical current increases. Because the system 100 includes path impedances, as described above, fuses 116 and relays 118 can be selected such that switching times of the relays 118 are faster than the opening times of the fuses 116, even at the maximum fault current value for the system 100.

The threshold value for the electrical current, in one embodiment, is greater than the current rating of the fuses 116. One of skill in the art will recognize that fuse current ratings are typically expressed as an RMS current. For example, a 10 A fuse is rated to 10 A RMS and at 10 A RMS, sees peak currents of about 14.1 A. Note that the currents expressed herein are RMS currents unless noted otherwise and that the relay 118 may be opened based on an RMS current or may be opened based on an instantaneous current that is converted from an RMS current based on a fixed ratio. In a further embodiment, the threshold value for the electrical current is between about twenty and forty percent greater than the current rating of the fuses 116. In another embodiment, the threshold value for the electrical current is about thirty percent greater than the current rating of the fuses 116. In one embodiment, the threshold value is adjustable, and may be dynamically selected by a user. In a further embodiment, the threshold value is selected to protect the electrical loads 108. The threshold value may also be selected to allow a certain amount of overload current without opening a relay 118.

The fault module 122, in one embodiment, may include a digital or analog comparator that compares the current amplitude signal to the threshold value. For example, in one embodiment, the current amplitude signal has a voltage that is proportional to the amplitude of the electrical current, and the fault module 122 compares the voltage of the current amplitude signal to a reference voltage that is proportional to the threshold value. In another example embodiment, the current amplitude signal provides a digital value that represents the amplitude of the electrical current, and the fault module 122 compares the digital value to a digital representation of the threshold value. In one embodiment, each relay 118 or group of relays 118 includes a separate fault module 122. In another embodiment, the apparatus 100 includes a fault module 122 that is operable to independently generate a control signal for each relay 118 or group of relays 118 ganged together.

In one embodiment, the several AC electrical outputs 124 provide the flow of AC electrical current to the electrical loads 108. The AC electrical outputs 124 may include connectors, ports, plugs, outlets, contacts, wires, circuit traces, power busses, or the like that make electrical connections with the electrical loads 108. In the depicted embodiment, each parallel branch of the three AC phases 110, 112, 114 includes an AC electrical output 124 to provide AC power to an electrical load 108. In a further embodiment, a parallel branch may be further split into additional branches with additional AC electrical outputs 124. In another embodiment, each AC phase 110, 112, 114 may have a single AC electrical output 124, with no parallel branches.

Similarly, in the depicted embodiment, each AC electrical output 124 includes a fuse 116 and a relay 118 in a series configuration between the AC electrical input 106 and the AC electrical output 124 to protect the AC electrical output 124 from overcurrent faults. In another embodiment, a fuse 116 and a relay 118 may protect several AC electrical outputs 124, an entire PDU 102, or the like.

Figure 2:
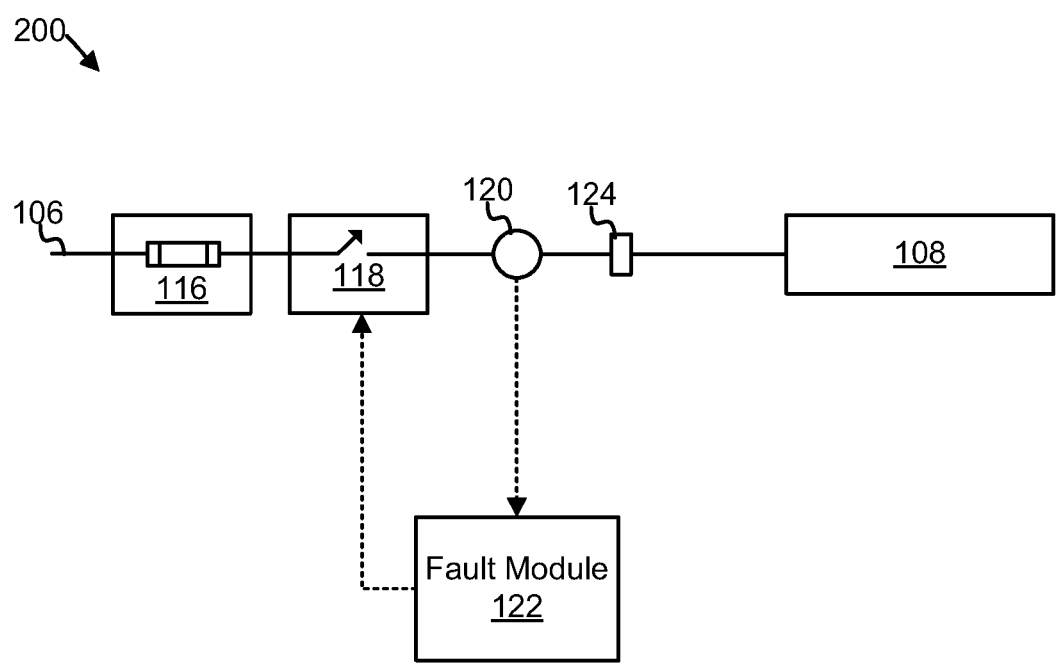
FIG. 2 is a schematic block diagram illustrating one embodiment of an apparatus to protect a power distribution unit from an electrical fault in accordance with the present invention.

FIG. 2 depicts one embodiment of an apparatus 200 to protect a PDU 102 from an electrical fault. The apparatus 200, in the depicted embodiment, includes an AC electrical input 106, an electrical load 108, a fuse 116, a relay 118, a current sensor 120, the fault module 122, and an AC electrical output 124, as described above with regard to FIG. 1. The apparatus 200 may protect the entire PDU 102, a single AC phase 110, 112, 114, several AC phases 110, 112, 114, a single parallel branch of an AC phase 110, 112, 114, or the like.

In the depicted embodiment, the AC electrical input 106 is an input of the fuse 116. The AC electrical input 106 receives a flow of AC electrical power. The fuse 116, the relay 118, the AC electrical output 124, and the electrical load 108 each receive the flow of AC electrical power in series.

The current sensor 120 measures the amplitude of the flow of AC electrical current. In the depicted embodiment, the current sensor 120 is disposed at an output of the relay 118. In further embodiments, the current sensor 120 may be disposed elsewhere within the apparatus 200, such as at the AC electrical input 106, at an input or output of the fuse 116, at an input of the relay 118, at the AC electrical output 124, or the like. Similarly, in a further embodiment, the fuse 116 and the relay 118 may be placed in different locations and different orders within the apparatus 200.

In the depicted embodiment, the current sensor 120 outputs the current amplitude signal directly to the fault module 122. In a further embodiment, additional components, such as an analog to digital converter, a data storage medium, another module, or the like may be disposed between the current sensor 120 and the fault module 122 to process, buffer, store, or otherwise manipulate the current amplitude signal.

In the depicted embodiment, the fault module 122 receives the current amplitude signal from the current sensor 120, and sends an OFF signal to the relay 118 to open the relay 118 in response to the amplitude of the electrical current exceeding the threshold value for the electrical current, to prevent the fuse 116 from opening before the relay 118. The fault module 122, in one embodiment, sends the ON signal to the relay 118 otherwise, during operation of the apparatus 200. In another embodiment, the fault module 122 may provide overcurrent protection for additional AC electrical outputs 124 by receiving additional current amplitude signals and sending ON and OFF signals to additional relays 118.

Figure 3:
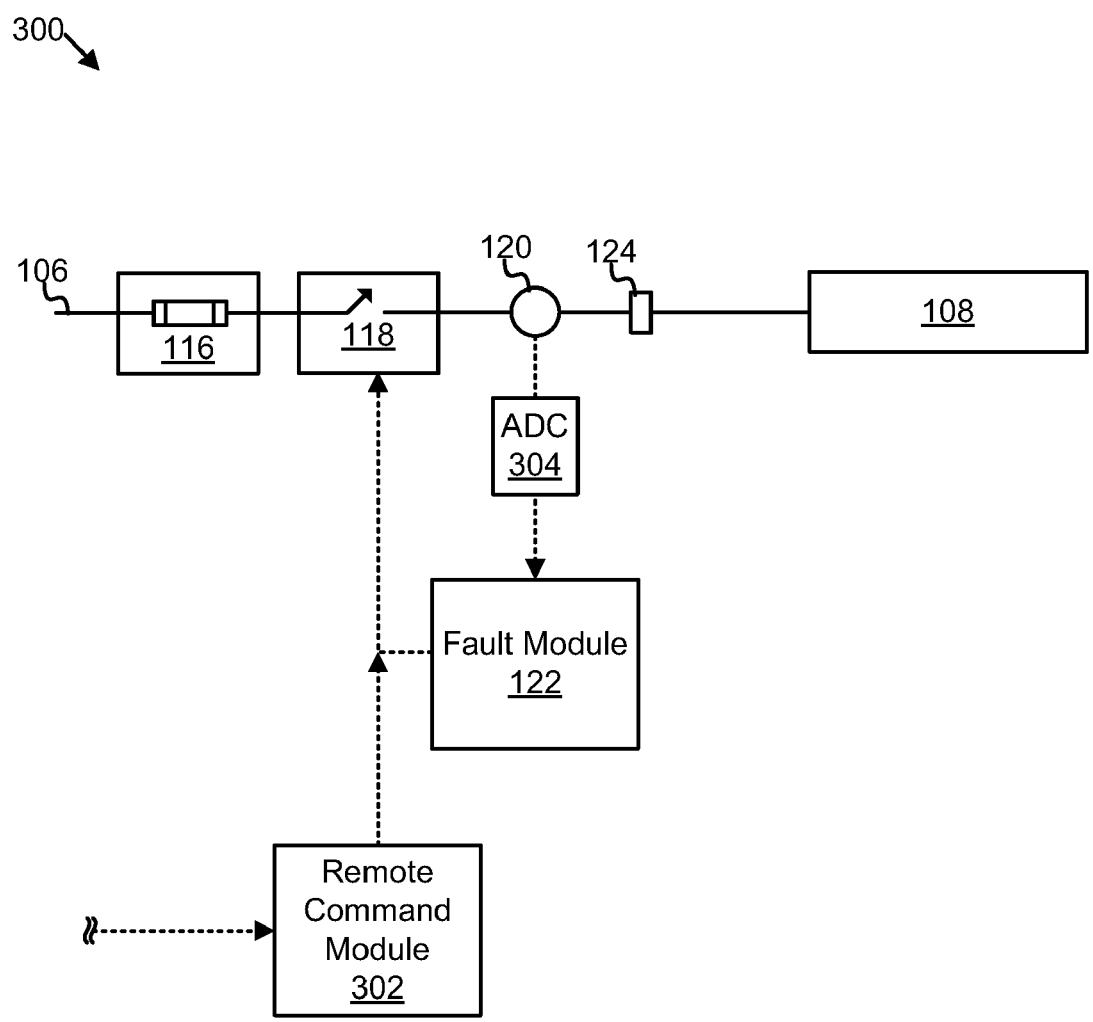
FIG. 3 is a schematic block diagram illustrating another embodiment of an apparatus to protect a power distribution unit from an electrical fault in accordance with the present invention.

FIG. 3 depicts one embodiment of an apparatus 300 to protect a PDU 102 from an electrical fault. In the depicted embodiment, the apparatus 300 is substantially similar to the apparatus 200 of FIG. 2, with the addition of a remote command module 302 and an analog to digital converter 304.

In the depicted embodiment, the current sensor 120 outputs an analog current amplitude signal that represents the amplitude of the electrical current. For example, the analog current amplitude signal may have a voltage that is proportional to the amplitude of the electrical current or the like. The analog to digital converter 304, in the depicted embodiment, receives the analog current amplitude signal from the current sensor 120 and converts the current amplitude signal from an analog signal to a digital signal. The analog to digital converter 304 provides the digital current amplitude signal to the fault module 122.

In the depicted embodiment, the remote command module 302 sends an OFF signal to the relay 118 in response to an OFF remote communications signal and sends an ON signal to the relay 118 in response to an ON remote communications signal. The remote command module 302 may send the ON and OFF signals to the relay 118 directly, indirectly through the fault module 122, or otherwise.

The remote command module 302 receives the remote communications signals from a source exterior to the apparatus 200 and the PDU 102. In one embodiment, the remote command module 302 may receive the remote communications signals over a wired or wireless data connection such as an Ethernet connection, an 802.11 wireless connection, a serial port connection, a universal serial bus ("USB") connection, or the like. In one embodiment, each branch, line, or node within a PDU 102 is addressed, such that the remote command module 302 may send ON and OFF signals to each branch, line, or node individually based on a received address.

The remote command module 302 allows a remote user or module to interrupt the flow of AC electrical current to the electrical load 108 and to provide the flow of AC electrical current to the electrical load 108 remotely without being physically present on location with the apparatus 300 and the electrical load 108. In one embodiment, the remote command module 302 allows a remote user to reset the apparatus 300 in response to an overcurrent fault by sending an ON remote communication signal to the remote command module 302. If there is still an overcurrent fault condition, the fault module 122, in one embodiment, may then reopen the relay 118 by sending an OFF signal.

Figure 4:
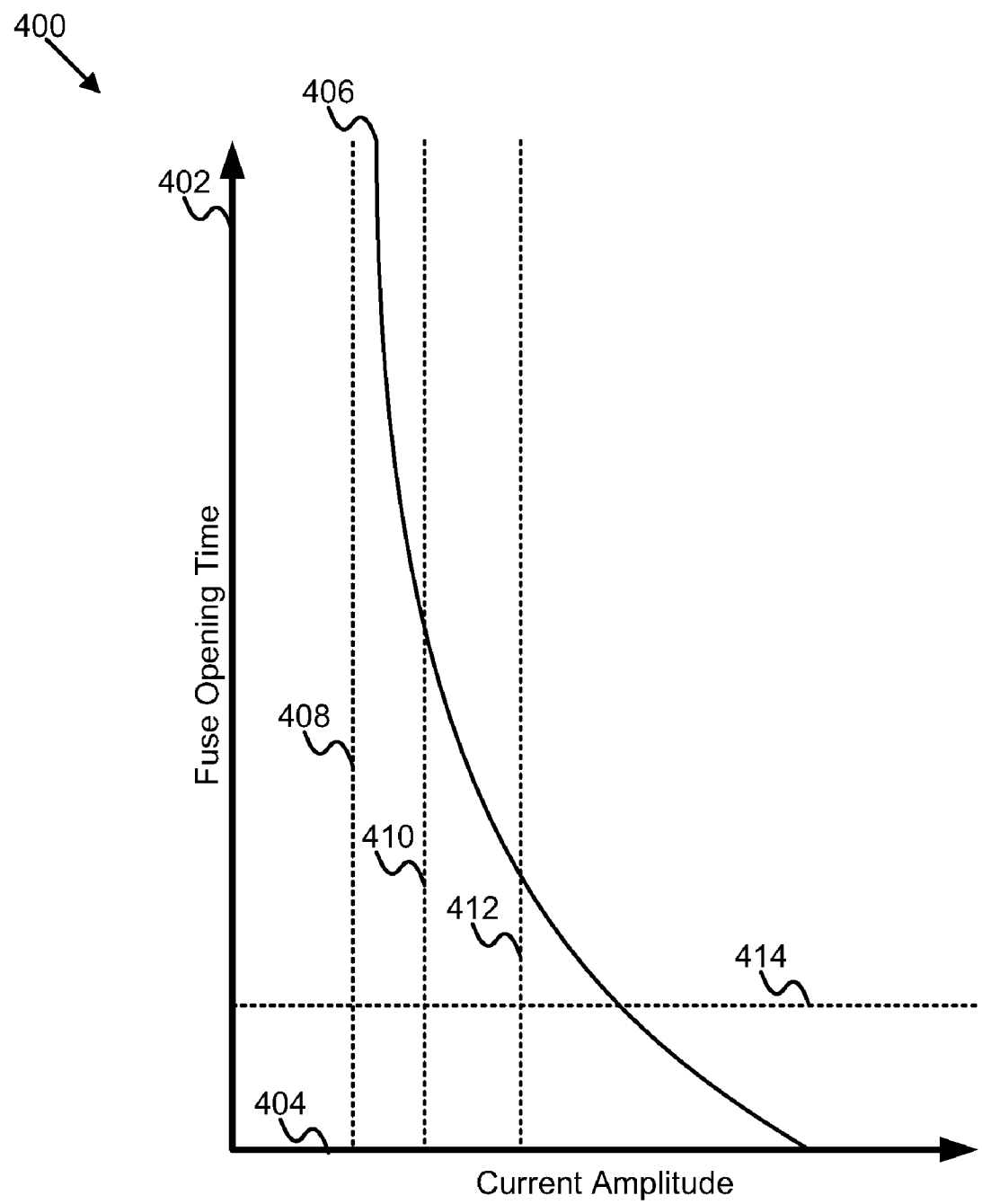
FIG. 4 is a schematic block diagram illustrating one embodiment of an inverse time-current function of a fuse in accordance with the present invention.

FIG. 4 depicts one embodiment 400 of an inverse time-current function 406 of a fuse 116. In the depicted embodiment 400, the inverse time-current function 406 is illustrated with regard to an opening time 402 axis for a fuse 116 and a current amplitude 404 axis for the flow of AC electrical current. The embodiment 400 further depicts a current rating 408, a threshold value 410 for the AC electrical current, a maximum fault current value 412 for the AC electrical current, and a switching time 414 of a relay 118.

In one embodiment, the opening time 402 axis and/or the current amplitude 404 axis may not be depicted to scale, and may further have a logarithmic or exponential scale. The depicted inverse time-current function 406 is one embodiment of an inverse time-current function, and will vary based on characteristics of the fuse 116.

In the depicted embodiment 400, based on the inverse time-current function 406, the opening time 402 of the fuse 116 decreases as the current amplitude 404 increases. The fuse 116, in the depicted embodiment 400, will typically not open at all when the current amplitude 404 is lower than the current rating 408 of the fuse 116 or slightly greater than the current rating 408 of the fuse 116. As the current amplitude 404 increases above the current rating 408 of the fuse 116, the opening time 402 decreases based on the inverse time-current function 406.

In the depicted embodiment 400, the switching time 414 of the relay 118 is less than the opening time 402 of the fuse 116 between the threshold value 410 and the maximum fault current value 412. In the depicted embodiment 400, the maximum fault current value 412 is based on characteristics of a circuit that includes the fuse 116, such as path impedances, and is not based on the inverse-time current function 406 for the fuse 116.

In one embodiment, to ensure that the relay 118 prevents the fuse 116 from opening during an overcurrent fault, the switching time 414 of the relay 118 is at least ten times less than the opening time 402 of the fuse 116 for a current amplitude 404 of the electrical current between the threshold value 410 and the maximum fault current value 412. In a further embodiment, the switching time 414 of the relay 118 is less than about fifty milliseconds and the opening time 402 of the fuse 116 is greater than about half of a second for current amplitudes 404 between the threshold value 410 and the maximum fault current value 412. Based on the inverse time-current function 406, the threshold value 410, the maximum fault current value 412, and the switching time 414 of the relay 118, the fuse 116 only opens in response to a failure of the relay 118 or another abnormal event.

Figure 5:
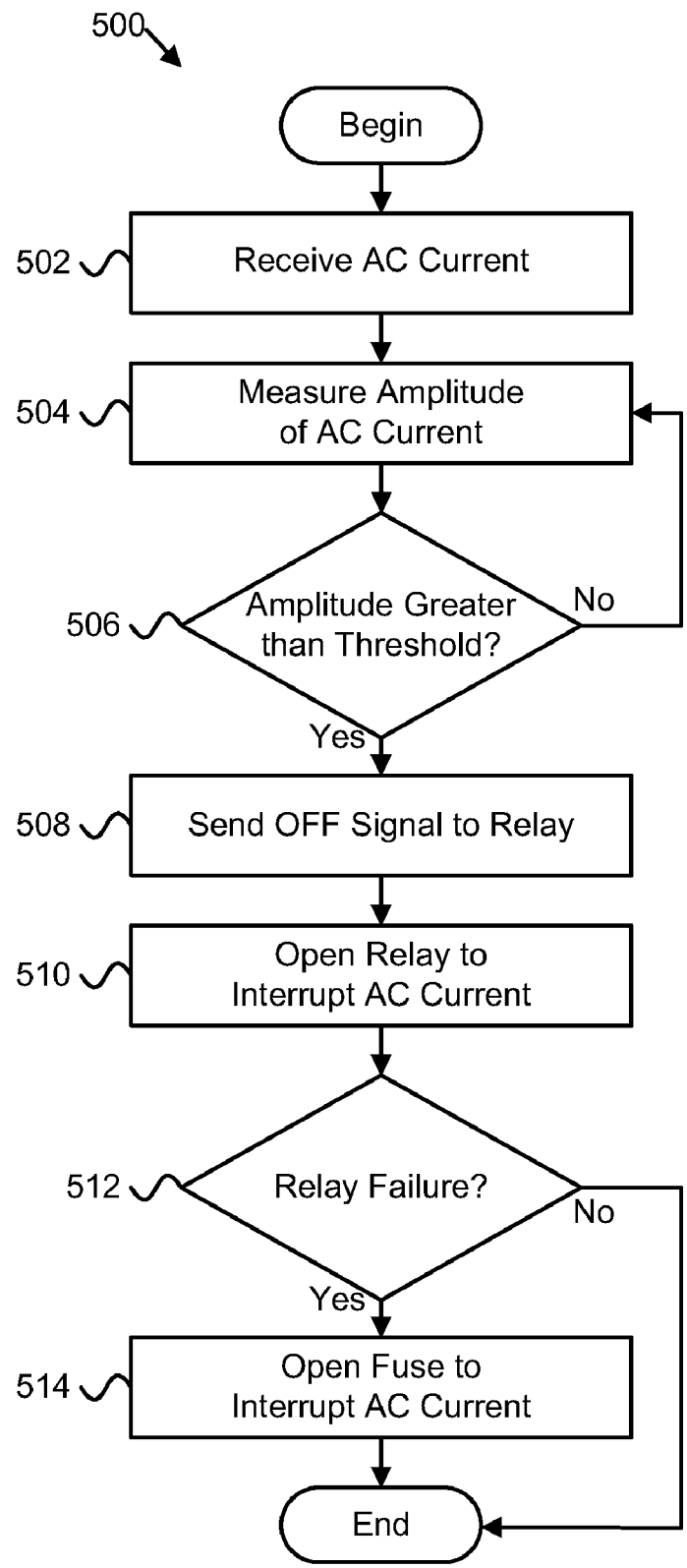
FIG. 5 is a schematic flow chart diagram illustrating one embodiment of a method for protecting a power distribution unit from an electrical fault in accordance with the present invention.

FIG. 5 depicts one embodiment of a method 500 for protecting a PDU 102 from an electrical fault. The method 500 begins, and the AC electrical input 106 receives 502 a flow of AC electrical current. The current sensor 120 measures 504 the amplitude of the AC electrical current and provides a current amplitude signal to the fault module 122.

The fault module 122 determines 506 whether the amplitude of the AC electrical current is greater than the threshold value 410 for the AC electrical current. If the fault module 122 determines that the amplitude of the AC electrical current is not greater than the threshold value 410, the method 500 returns to the measuring step 504 and the current sensor 120 continues to measure 504 the amplitude of the AC electrical current. If the fault module 122 determines that the amplitude of the AC electrical current is greater than the threshold value 410, the fault module 122 sends 508 the OFF signal to the relay 118 and the relay 118 opens 510 to interrupt the AC electrical current.

If the relay 118 fails 512 to open 510, the opening time of the fuse 116 transpires and the fuse 116 opens 514 to interrupt the AC electrical current and the method 500 ends. If the relay 118 does not fail 512 to open 510, the fuse 116 does not open 514 and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus to protect a power distribution unit ("PDU") from an electrical fault, the apparatus comprising:
an alternating current ("AC") electrical input that receives a flow of AC electrical current for a PDU;
a fuse that interrupts the flow of electrical current in response to the electrical current rising above a current rating of the fuse, the fuse interrupting the flow of electrical current according to an inverse time-current function that defines an opening time of the fuse based on an amplitude of the electrical current, the opening time decreasing as the amplitude of the electrical current increases;
a current sensor that measures the amplitude of the electrical current and outputs a current amplitude signal that represents the amplitude of the electrical current;
a relay that interrupts the flow of electrical current in response to an OFF signal and allows the flow of electrical current to continue from the AC electrical input in response to an ON signal, the relay comprising an electromechanical relay, the relay having a switching time;
a fault module that receives the current amplitude signal, the fault module sending the OFF signal to the relay in response to the amplitude of the electrical current exceeding the threshold value, the relay, the fuse, and the threshold value selected such that the switching time of the relay is less than the opening time of the fuse for an amplitude of the electrical current between the threshold value and a maximum fault current value, the opening time of the fuse based on the inverse time-current function of the fuse, the fault module preventing the fuse from opening by sending the OFF signal to the relay to interrupt the flow of electrical current, the switching time of the relay comprising a time for the current sensor to measure the amplitude of the electrical current, send a current amplitude signal to the fault module, for the fault module to determine that the amplitude exceeds the threshold value, send the OFF signal to the relay, and for the relay to interrupt the flow of the electrical current;
a remote command module that sends the OFF signal to the relay to interrupt the flow of AC electrical current to the electrical load in response to an OFF remote communications signal and that sends the ON signal to the relay to provide the flow of AC electrical current to the electrical load in response to an ON remote communications signal, the ON and OFF remote communications signals unrelated to detecting an overcurrent condition; and
an AC electrical output that provides the flow of AC electrical current to an electrical load, the fuse and the relay disposed in a series configuration between the AC electrical input and the AC electrical output within the PDU.

2. The apparatus of claim 1, further comprising an analog to digital converter that converts the current amplitude signal from an analog signal to a digital signal, the current sensor providing the analog signal to the analog to digital converter and the fault module receiving the digital signal from the analog to digital converter.

3. The apparatus of claim 1, wherein the switching time of the relay is at least ten times less than the opening time of the fuse for an amplitude of the electrical current between the threshold value and the maximum fault current value.

4. The apparatus of claim 3, wherein the switching time of the relay is less than about fifty milliseconds and the opening time of the fuse for the amplitude of the electrical current between the threshold value and the maximum fault current value is greater than about half of a second.

5. The apparatus of claim 1, wherein the maximum fault current value comprises an amplitude of the electrical current for a bolted fault at an output of the relay given path impedances between a source of the AC electrical current and the bolted fault.

6. The apparatus of claim 1, wherein the current rating of the fuse is sized to protect the electrical load.

7. The apparatus of claim 1, wherein the threshold value for the electrical current is about thirty percent greater than the current rating of the fuse.

8. The apparatus of claim 1, wherein the current amplitude signal comprises a voltage proportional to the amplitude of the electrical current.

9. The apparatus of claim 1, wherein the fault module instantaneously sends the OFF signal to the relay in response to the amplitude of the electrical current exceeding the threshold value.

10. The apparatus of claim 1, wherein the current sensor is selected from the group consisting of a Hall effect current sensor, a current transformer, and a current sense resistor.

11. The apparatus of claim 1, wherein the relay comprises a mercury-wetted relay.

12. The apparatus of claim 1, wherein the fuse comprises a slow-blow, time-delay fuse.

13. The apparatus of claim 1, wherein the flow of AC electrical current received at the AC electrical input comprises a single parallel branch from a single phase of a three phase AC power source connected to the PDU, wherein each of the three phases are split into a plurality of parallel branches within the PDU, wherein the PDU further comprises a fuse, a current sensor, a relay, and a fault module for each parallel branch.

14. The apparatus of claim 1, wherein the electrical load comprises a power supply unit ("PSU") of a blade server enclosure.

15. A system to protect a power distribution unit ("PDU") from an electrical fault, the system comprising:
a PDU;
an electrical load connected to the PDU;
an alternating current ("AC") electrical input that receives a flow of AC electrical current for the PDU;
a fuse that interrupts the flow of electrical current in response to the electrical current rising above a current rating of the fuse, the fuse interrupting the flow of electrical current according to an inverse time-current function that defines an opening time of the fuse based on an amplitude of the electrical current, the opening time decreasing as the amplitude of the electrical current increases;
a current sensor that measures the amplitude of the electrical current and outputs a current amplitude signal that represents the amplitude of the electrical current;
a relay that interrupts the flow of electrical current in response to an OFF signal and allows the flow of electrical current to continue from the AC electrical input in response to an ON signal, the relay comprising an electromechanical relay, the relay having a switching time;

a fault module that receives the current amplitude signal, the fault module sending the OFF signal to the relay in response to the amplitude of the electrical current exceeding the threshold value, the relay, the fuse, and the threshold value selected such that the switching time of the relay is less than the opening time of the fuse for an amplitude of the electrical current between the threshold value and a maximum fault current value, the opening time of the fuse based on the inverse time-current function of the fuse, the fault module preventing the fuse from opening by sending the OFF signal to the relay to interrupt the flow of electrical current, the switching time of the relay comprising a time for the current sensor to measure the amplitude of the electrical current, send a current amplitude signal to the fault module, for the fault module to determine that the amplitude exceeds the threshold value, send the OFF signal to the relay, and for the relay to interrupt the flow of the electrical current;

a remote command module that sends the OFF signal to the relay to interrupt the flow of AC electrical current to the electrical load in response to an OFF remote communications signal and that sends the ON signal to the relay to provide the flow of AC electrical current to the electrical load in response to an ON remote communications signal, the ON and OFF remote communications signals unrelated to detecting an overcurrent condition; and an AC electrical output that provides the flow of AC electrical current to the electrical load, the fuse and the relay disposed in a series configuration between the AC electrical input and the AC electrical output within the PDU.

16. The system of claim 15, wherein the current sensor is selected from the group consisting of a Hall effect current sensor, a current transformer, and a current sense resistor, wherein the relay comprises a mercury-wetted relay, wherein the fuse comprises a slow-blow, time-delay fuse, and further wherein the electrical load comprises a power supply unit ("PSU") of a blade server enclosure.

17. The system of claim 15, wherein the flow of AC electrical current received at the AC electrical input comprises a single parallel branch from a single phase of a three phase AC power source connected to the PDU, wherein each of the three phases are split into a plurality of parallel branches within the PDU, wherein the PDU further comprises a fuse, a current sensor, a relay, and a fault module for each parallel branch.

18. An apparatus to protect a power distribution unit ("PDU") from an electrical fault, the apparatus comprising:

an alternating current ("AC") electrical input that receives a flow of AC electrical current for a PDU, the flow of AC electrical current comprising a single parallel branch from a single phase of a three phase AC power source, wherein each of the three phases are split into a plurality of parallel branches within the PDU;

a fuse that interrupts the flow of electrical current in response to the electrical current rising above a current rating of the fuse, the fuse interrupting the flow of electrical current according to an inverse time-current function that defines an opening time of the fuse based on an amplitude of the electrical current, the opening time decreasing as the amplitude of the electrical current increases, the fuse comprising a slow-blow, time-delay fuse, the current rating of the fuse sized to protect an electrical load;

a current sensor that measures the amplitude of the electrical current and outputs a current amplitude signal that represents the amplitude of the electrical current, the current sensor comprising a Hall effect current sensor, the current amplitude signal comprising a voltage proportional to the amplitude of the electrical current;

an analog to digital converter that receives the current amplitude signal from the current sensor and converts the current amplitude signal from an analog signal to a digital signal;

a relay that interrupts the flow of electrical current in response to an OFF signal and allows the flow of electrical current to continue from the AC electrical input in response to an ON signal, the relay having a switching time, the relay comprising an electromechanical, mercury-wetted relay;

a fault module that receives the current amplitude signal, the fault module sending the OFF signal to the relay in response to the amplitude of the electrical current exceeding the threshold value, the relay, the fuse, and the threshold value selected such that the switching time of the relay is at least ten times less than the opening time of the fuse for an amplitude of the electrical current between the threshold value and a maximum fault current value, the opening time of the fuse based on the inverse time-current function of the fuse, the maximum fault current value comprising an amplitude of the electrical current for a bolted fault at an output of the relay given path impedances between a source of the AC electrical current and the bolted fault, the fault module preventing the fuse from opening by sending the OFF signal to the relay to interrupt the flow of electrical current, the switching time of the relay comprising a time for the current sensor to measure the amplitude of the electrical current, send a current amplitude signal to the fault module, for the fault module to determine that the amplitude exceeds the threshold value, send the OFF signal to the relay, and for the relay to interrupt the flow of the electrical current;

a remote command module that sends the OFF signal to the relay to interrupt the flow of AC electrical current to the electrical load in response to an OFF remote communications signal and that sends the ON signal to the relay to provide the flow of AC electrical current to the electrical load in response to an ON remote communications signal, the ON and OFF remote communications signals unrelated to detecting an overcurrent condition; and an AC electrical output that provides the flow of AC electrical current to the electrical load, the fuse and the relay disposed in a series configuration between the AC electrical input and the AC electrical output within the PDU, the electrical load comprising a power supply unit ("PSU") of a blade server enclosure, wherein the PDU further comprises a fuse, a current sensor, a relay, and a fault module for each parallel branch within the PDU.

* * * * *